United States Patent
Ye et al.

(10) Patent No.: US 7,639,627 B1
(45) Date of Patent: Dec. 29, 2009

(54) SYSTEM AND METHOD FOR TRACE REPLAY USING PARALLELIZED STREAMS

(75) Inventors: Tao Ye, Daly City, CA (US); Darryl Neil Veitch, Melbourne (AU); Gianluca Iannaccone, Cambridge (GB); Supratik Bhattacharyya, San Francisco, CA (US)

(73) Assignee: Sprint communications Company L.P., Overland Park, KS (US)

( * ) Notice: Subject to any disclaimer, the term of this patent is extended or adjusted under 35 U.S.C. 154(b) by 606 days.

(21) Appl. No.: 11/061,241

(22) Filed: Feb. 18, 2005

(51) Int. Cl.
*H04L 12/26* (2006.01)
(52) U.S. Cl. .................................................. 370/252
(58) Field of Classification Search ....................... None
See application file for complete search history.

(56) References Cited

U.S. PATENT DOCUMENTS

| | | | |
|---|---|---|---|
| 5,140,586 A * | 8/1992 | Kloper et al. ............... | 370/216 |
| 5,274,768 A * | 12/1993 | Traw et al. .................. | 709/236 |
| 5,640,388 A * | 6/1997 | Woodhead et al. .......... | 370/468 |
| 6,374,307 B1 * | 4/2002 | Ristau et al. ................ | 709/249 |
| 6,381,250 B1 * | 4/2002 | Jacobson et al. ............ | 370/468 |
| 6,389,018 B1 * | 5/2002 | Clauberg ..................... | 370/394 |
| 6,650,660 B1 * | 11/2003 | Koehler et al. .............. | 370/503 |
| 6,658,457 B2 * | 12/2003 | Nishikawa et al. .......... | 709/206 |
| 6,671,254 B1 * | 12/2003 | Nakahira .................... | 370/229 |
| 6,735,219 B1 * | 5/2004 | Clauberg .................... | 370/474 |
| 6,778,536 B1 * | 8/2004 | Ofek et al. ............... | 370/395.4 |
| 6,950,405 B2 * | 9/2005 | Van Gerrevink ............ | 370/252 |
| 7,058,696 B1 * | 6/2006 | Phillips et al. .............. | 709/217 |
| 7,136,953 B1 * | 11/2006 | Bisson et al. ............... | 710/307 |
| 7,146,516 B2 * | 12/2006 | Dhupar et al. .............. | 713/400 |
| 7,174,385 B2 * | 2/2007 | Li ............................... | 709/231 |
| 2003/0117998 A1 * | 6/2003 | Sala et al. ................... | 370/351 |
| 2004/0243894 A1 * | 12/2004 | Smith et al. ................. | 714/724 |
| 2005/0195741 A1 * | 9/2005 | Doshi et al. ................. | 370/230 |
| 2006/0053209 A1 * | 3/2006 | Li ............................... | 709/217 |
| 2007/0008883 A1 * | 1/2007 | Kobayashi .................. | 370/230 |

OTHER PUBLICATIONS

Chuck Fraleigh, Packet Level Traffic Measurements from the Sprint IP Backbone, Dec. 2003, IEEE Network, pp. 6-16.*
Tao Ye, et al., Divide and Conquer: PC-based Packet Trace Replay at OC-48 Speeds, (to the best of Applicant's knowledge posted Nov. 2004).
Tao Ye, et al ., Divide and Conquer: PC-based Packet Trace Replay at OC-48 Speeds, at http://ipmon.sprint.com/pubs_trs/pubs/tye/treplay.pdf, (to the best of Applicant's knowledge posted Nov. 2004).

* cited by examiner

*Primary Examiner*—Steven H Nguyen
*Assistant Examiner*—Alex Skripnikov

(57) ABSTRACT

The invention relates to a system and method for generating realistic network traffic by replaying captured network traffic using parallelized streams of subtraces. In accordance with one method of the invention, a captured trace of network traffic from a network link is provided. The captured trace is split into a number of subtraces. The subtraces are replayed and then recombined into a recombined trace, wherein the timing of packets in the recombined trace approximates the timing of packets in the captured trace.

24 Claims, 2 Drawing Sheets

SYSTEM AND METHOD FOR TRACE REPLAY USING PARALLELIZED STREAMS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the field of computers. More specifically, the present invention also relates to a system and method for replaying a captured trace of network traffic.

BACKGROUND OF THE INVENTION

In today's Internet, backbone routers are capable of processing packets at 10 Gbps, creating a huge challenge for the design of network monitoring devices based on commodity hardware. To better design and thoroughly test such devices, it is crucial to test them under realistic traffic conditions. For devices located close to backbone links, this means providing traffic loads whose characteristics match, in many detailed respects, those found on real-world links at OC-48 rates and above.

Some traffic generation hardware can produce the required raw bandwidth and can also provide limited IP address variability at the flow level. Some software solutions simulate traffic at the application level but cannot produce the high bandwidth that is demanded. However, synthetic traffic generators such as these are expensive, and it is generally extremely difficult to characterize (and thus reproduce) realistic flow, packet, and address arrival patterns, or flow arrival intensities in the range of thousands per second, such as found in the Internet.

An alternative to avoid the above disadvantages is to "replay" stored real traffic. Several tools can replay captured traffic through output linecards operating at rates equal to or higher than those of the original traces. For example, stored ethernet trace data (100 Mbps-1 Gbps) may be replayed through ethernet interfaces. However, this option is not possible for very high speed links (OC-48 and above) using currently available linecards. The cards used to capture such traffic can in principle be used for retransmission. However, they are not currently designed for this more demanding purpose. These cards have very limited retransmission capabilities. Namely, they can only retransmit a trace at full link rate, completely disregarding the original packet timing. Moreover, the replay feature is not available at OC-192 speeds and above, probably due to the much higher demands that traffic generation places on the card and PC host, compared to passively capturing headers.

Accordingly, a system and method to generate realistic traffic at high speeds would be desirable. Additionally, it would be advantageous if the generated traffic provided an accurate traffic mix. Further, a highly scalable and low-cost approach to generating such traffic would be advantageous.

SUMMARY OF THE INVENTION

The present invention is directed to a system and method for generating realistic network traffic by replaying captured network traffic using parallelized streams of subtraces. Thus, in one aspect, an embodiment of the present invention relates to a method for generating realistic network traffic. In accordance with the method, a captured trace of network traffic from a network link is provided. The captured trace is split into a number of subtraces. The subtraces are replayed and then recombined into a recombined trace, wherein the timing of packets in the recombined trace approximates the timing of packets in the captured trace.

In another aspect of the invention, an exemplary embodiment is directed to a system for generating realistic network traffic. The system includes at least one trace splitter, a number of replayers, and at least one recombiner. The trace splitter splits a captured trace of network traffic into a plurality of subtraces. The replayers replay the plurality of subtraces. The recombiner recombines the plurality of subtraces into a recombined trace.

BRIEF DESCRIPTION OF THE SEVERAL VIEWS OF THE DRAWINGS

The present invention is described in detail below with reference to the attached drawing figures, which are incorporated by reference herein and wherein.

DETAILED DESCRIPTION OF THE INVENTION

Figure 1:
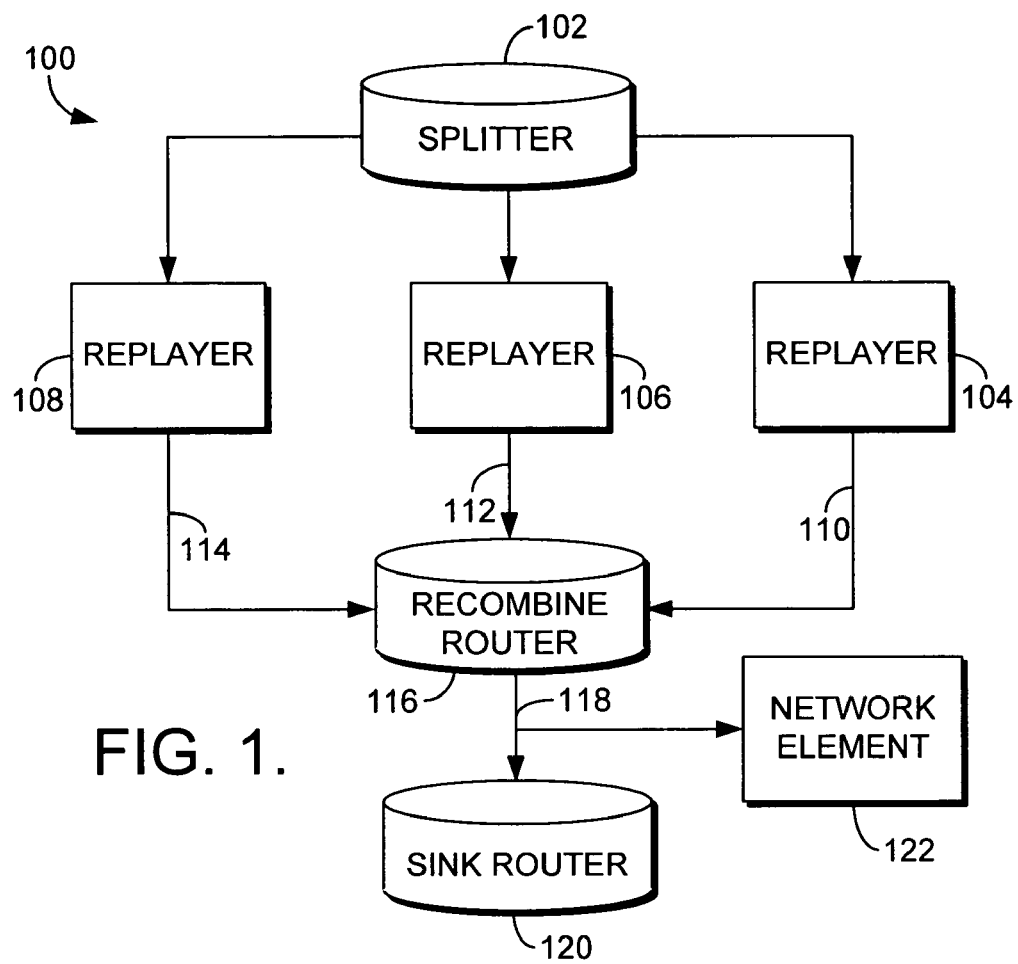
FIG. 1 is a block diagram of an exemplary computing environment suitable for use in implementing the present invention.

The present invention provides a system and method for generating realistic network traffic by replaying a captured trace using parallelized streams of subtraces of the original captured trace.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| Gbps | Gigabits per second |
| GigE | Gigabit Ethernet |
| GPS | Global Positioning System |
| NIC | Network Interface Card |
| NTP | Network Time Protocol |
| OC | Optical Carrier |
| TSC | Time Stamp Counter |

Further, various technical terms are used throughout this description. A definition of such terms can be found in *Newton's Telecom Dictionary* by H. Newton, 19th Edition (2003). These definitions are intended to provide a clearer understanding of the ideas disclosed herein but are in no way intended to limit the scope of the present invention. The definitions and terms should be interpreted broadly and liberally to the extent allowed by the meaning of the words offered in the above-cited reference.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Exemplary Architecture

Referring to FIG. 1, a block diagram is shown of an exemplary replay system 100 in which exemplary embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Replay system 100 generates realistic network traffic by splitting a captured trace of network traffic into a number of subtraces, replaying each of the subtraces, and recombining the subtraces into a single stream of traffic. Replay system 100 includes splitter 102, replayers 104, 106, and 108, replay links 110, 112, and 114, recombine router 116, recombine link 118, sink router 120, and network element 122.

Replay system 100 splits a captured trace into a number of subtraces, which are replayed by a corresponding number of replayers. For example, replay system 100 illustrates an embodiment of the invention in which a trace is split into three subtraces, which are replayed by three replayers. Splitter 102 is any device known in the art, such as a PC, capable of splitting a captured trace into a number of subtraces. Each subtrace may be distributed from splitter 102 to one of the replayers.

Replayers 104, 106, and 108, may each be any type of general purpose or specialized computing device. By way of example and not limitation, replayers 104, 106, and 108 may be commodity hardware, such as PCs. Each replayer has a network interface component, such as a network interface card (NIC), for interfacing with its respective replay link and for replaying a subtrace. Because the captured trace is being replayed by multiple replayers, the NICs may operate at a lower speed than the link from which the trace was captured. Likewise, the replay links may each have a smaller bandwidth than the captured trace. For example, the captured trace may be from an OC-48 link, while the NICs may be Gigabit Ethernet (GigE) interfaces and the replay links may be GigE links. Although replayers 104, 106, and 108 are shown as discrete components, the replayers could be combined into a single unit with multiple output interfaces.

Links 110, 112, and 114 respectively connect replayers 104, 106, and 108 to recombine router 116. Recombine router 116 may be any type of device known in the art, such as a router, that is capable of merging a number of traffic streams into a single stream. Recombine router 116 merges the subtraces from the replayers 104, 106, and 108 into a single traffic stream, which is transmitted over recombine link 118. Recombine router 116 and recombine link 118 each must have a bandwidth comparable to the bandwidth of the link for the original captured trace.

The recombined stream is sent from recombine router 116 to sink router 120 via recombine link 118. The recombined stream traveling along link 118 may be used for any type of testing purposes. For example, the recombined stream may be used to test a network element, such as network element 122. By way of example and not limitation, network element 122 may be a new type of router, an intrusion detection device, or a generic network monitoring device.

Exemplary Method for Replaying Trace

The subject matter of the present invention is described with specificity herein to meet statutory requirements. However, the description itself is not intended to limit the scope of this patent. Rather, the inventor has contemplated that the claimed subject matter might also be embodied in other ways, to include steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed.

Figure 2:
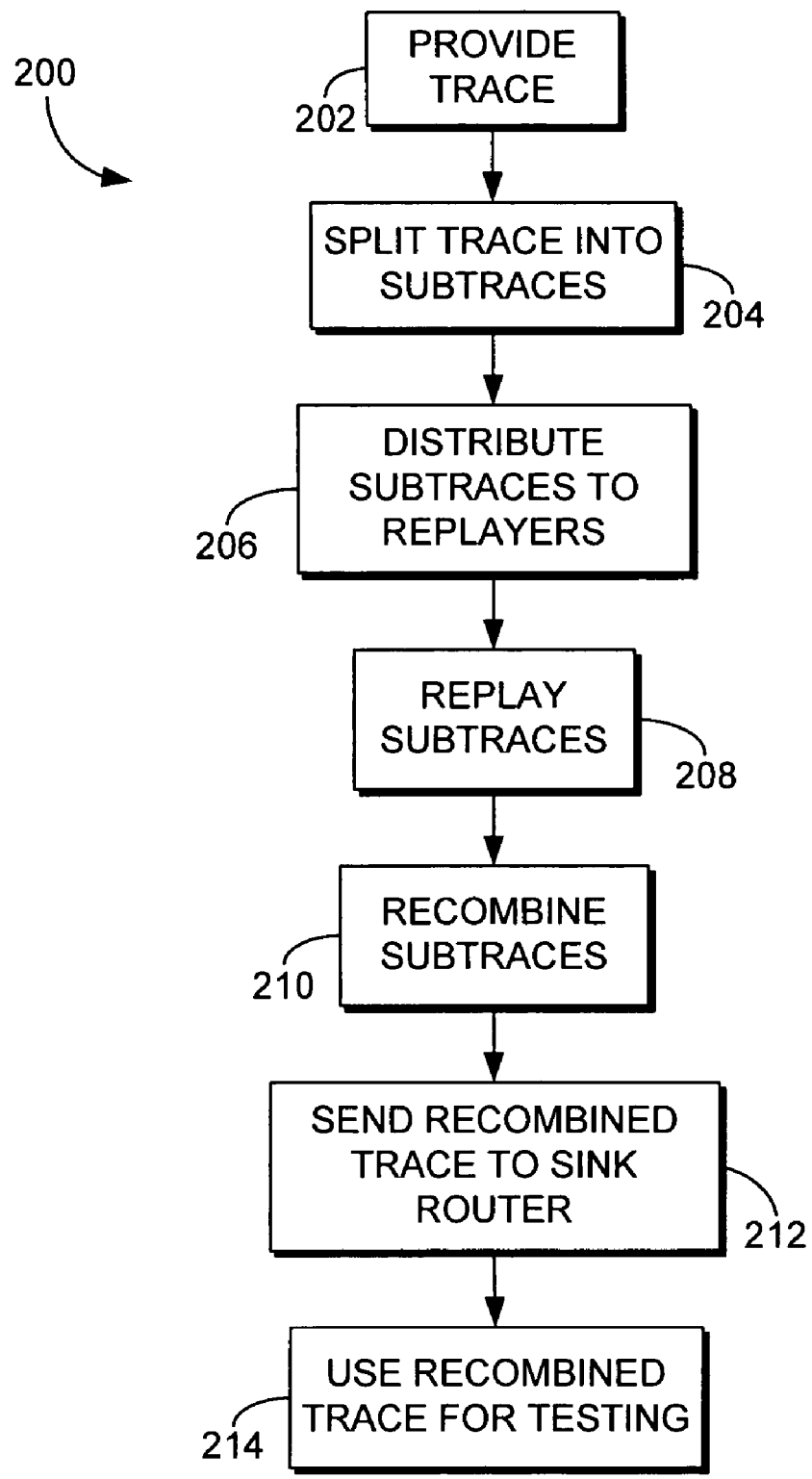
FIG. 2 is a flow diagram showing a method for replaying a captured trace in accordance with an embodiment of the present invention.

As previously mentioned, the present invention relates to a system and method for generating realistic network traffic. Turning to FIG. 2, a flow diagram of an exemplary embodiment of the invention is illustrated which shows the overall method 200 of replaying a captured trace of network traffic using parallelized streams of subtraces of the original captured trace. The process begins at step 202 by providing a trace. The trace consists of real network traffic that was previously captured and stored using any type of traffic capture tool known in the art. For example, OC-48 link traffic can be captured using an optical splitter to split to a PC fitted with an Endace DAG card. The DAG card can be GPS time synchronized to provide precise timing, such that each packet of the trace is given a very precise timestamp when it is captured. In an embodiment, the invention employs a high-speed trace from a network backbone with transmission rates of OC-48 and above. However, any high bandwidth link trace may be employed within the scope of the invention. Importantly, because the invention may use a captured trace from a link with any bandwidth, the invention may continue to be employed as network bandwidth capabilities continue to increase.

As shown at step 204, the trace is split into a number of subtraces by allocating packets from the trace to each of the subtraces. Any method, such as a round-robin allocation or a flow-based splitting, may be used to allocate the packets within the scope of the invention. In addition, any number of subtraces (with a corresponding number of replayers) may be employed within the scope of the invention. However, the method of packet-allocation and the number of subtraces employed affects the ability to generate recombined traffic with a pattern of packet arrival times that is as close as possible to that of the original captured trace.

Figure 3:
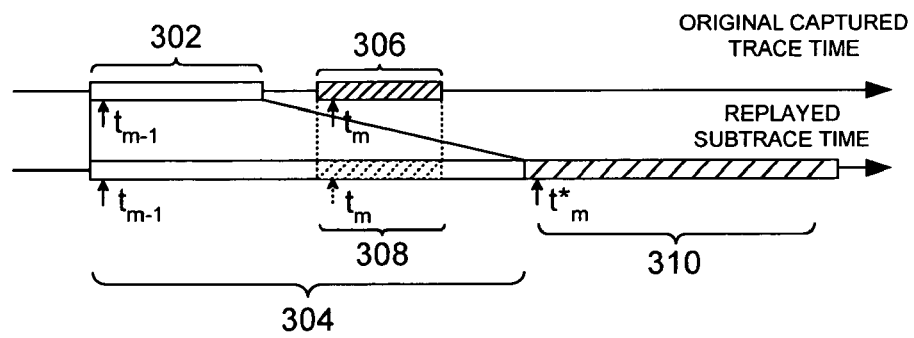
FIG. 3 is a diagram illustrating packet stretching resulting from replaying a trace at a speed slower than the original transmission.

In particular, the phenomenon of packet stretching, which may lead to "overlapping" packets, is a concern. Because the replayers are limited by interfaces that are slower than the link for the original captured trace, packets are stretched when they are replayed, as illustrated by FIG. 3. A packet of size p bytes, which has a width of $p/\mu^o$ seconds in the original trace, as shown by packet 302, is stretched to $p/\mu^r$ seconds on a replayer machine, as shown by packet 304. For example, a 1500 byte packet goes from 4.8 µs to 15 µs with $(\mu^o, \mu^r)=(2.5, 1)$ Gbps. If packets, such as packet 302 and packet 306, that are "too close" (e.g., back to back) in the original captured trace are allocated to the same replayer, the stretching effect would cause the packets to overlap if the second packet were to be queued at the corresponding instant of the original captured trace, as shown by packet 308. Because overlap of packets is impossible, the timing of the second packet must be displaced, as shown by packet 310. Thus, the packets will be necessarily pushed together by queuing in the replayer and thus be displaced from their original positions, distorting the trace.

Given a fixed number of subtraces, a round-robin allocation of packets to the subtraces would be optimal in terms of eliminating the adverse effects of stretching. However, this approach has the disadvantage that packets within the same flow (defined as the five-tuple: source and destination address, source and destination ports, and protocol number) could often be reordered in the replayed trace, which may be a disadvantage from an application perspective. In flow-based splitting, however, the order and relative timing of all packets within any given flow is preserved, and therefore so are the semantics of many important flow-based applications such as TCP. Analysis of several OC-48 traces has shown that 99% of consecutive packets in a trace belong to different flows. Therefore, flow-based splitting has the potential to do almost as well as a round-robin allocation of packets.

Flow-based splitting has other advantages. It is well accepted that the main generator of long range dependence in packet arrival processes is the heavy tailed nature of flow sizes (due in turn to heavy tailed file sizes). Since flow-based splitting inherently preserves flow statistics, such as the number of packets per flow, long range dependence is also naturally retained.

Another advantage of flow-based splitting is more subtle. Recent work has shown that when modeling the full packet arrival process of backbone traces, the flow arrival process component can be reasonably approximated by a Poisson process. This suggests that performing a random splitting at the flow level (rather than say by round-robin) may benefit from the well known splitting property of Poisson streams, namely, that a random splitting of a Poisson stream results in independent sub-streams that are again Poisson. This independence makes it easier to interpret the sub-streams and to check that they behave as expected.

Thus, an embodiment of the invention employs a flow-based splitting whereby all packets belonging to a single flow are assigned to the same replayer. Furthermore, the flow allocation is random in that the choice of replayer from one flow to the next are independent and of equal probability.

Another consideration is the number of subtraces (and corresponding number of replayers) split from the original captured trace. A smaller number of replayers is economical and limits practical complications such as clock synchronization, configuration management, and uniformity of replayers. However, a larger number of subtraces reduces the workload per replayer and increases inter-packet time as well as operating system contention affecting timestamping and sending accuracy.

If it were only a question of aggregate rate, the number of subtraces could be determined by providing a number of replayers whose aggregate transmission rate matches the transmission rate of the original trace. For example, for a OC-48 trace (2.488 Gbps) and replayers with GigE cards (1 Gbps), three replayers would be sufficient. However, since traffic is bursty, the impact of the stretching effect is more complex than this, and our random flow-based splitting cannot guarantee that "overlapping" does not occur. To measure the extent of the "overlapping" problem, a substream may be passed through a FIFO queue with deterministic service rate of $\mu^r$. Referring again to FIG. 3, packets arrive (in their entirety) to this queue at the instants $\{t_m\}$, and begin service at $\{t^*_m\}$. Ideally, $t^*_m = t_m$, but due to a previous packet's stretching, "overlapping" may occur when $t^*_m > t_m$.

The following "overlapping" statistic may be computed: $|t^*_m - t_m|$ which takes values that are zero (perfect replay is possible for packet m) or positive (not possible). In Table 1 below, an example of the severity of "overlapping" is shown in the mean of packet displacement for the replay of an original captured trace. N represents the number of subtraces and corresponding replayers. Here at N=1, the average displacement is 2.8 seconds. The 95th percentile is also given. Looking at the average magnitude of "overlap" in particular, the severity drops rapidly with N.

TABLE 1

| N | Mean (µs) | 95th Percentile (µs) |
|---|---|---|
| 1 | 2813909 | 5328205 |
| 2 | 13.09 | 50.83 |
| 3 | 3.99 | 16.67 |
| 4 | 2.31 | 11.18 |
| 5 | 1.63 | 8.10 |
| 6 | 1.32 | 7.13 |
| 8 | 0.87 | 6.61 |
| 12 | 0.59 | 5.75 |
| 18 | 0.79 | 3.25 |
| 24 | 0.20 | 2.14 |

It would be possible to refine the split in a iterative way. First, a split is performed with a small number of subtraces (and corresponding number of replayers). Then, the severity of "overlapping" is evaluated. If the severity of "overlapping" is too high, a further random split could be performed. Given that the flows are always chosen randomly at each iteration, the Poisson splitting and merging paradigm would still apply. Splitting could continue in a tree structure until some severity criterion is met.

Referring again to FIG. 2, once the type of packet allocation and the number of subtraces has been determined and the original captured trace has been split into N subtraces, the subtraces are distributed to the replayers, as shown at step 206. After the subtraces have been distributed, the replayers replay the subtraces, as shown at step 208. The replayers replay each packet according to its capture timestamp.

Precise timing among the replayers aids in producing recombined traffic that closely approximates the original captured trace. Therefore, in an embodiment, the replayers are synchronized to provide an accurate replay. Any method of synchronization may be used within the scope of the present invention. By way of example and not limitation, one replayer, using its local system clock as a reference, may act as an NTP (Network Time Protocol) server for the others. Immediately before replaying, the NTP may be turned off to avoid clock readjustment that may cause jitters in timing. As another example, a TSC (Time Stamp Counter) clock-based remote synchronization method may be employed by the invention.

At step 210, the subtraces are combined at the recombine router. The recombine router then directs the recombined traffic toward the sink router, as shown at step 212. The recombined traffic traveling between the recombine router and sink router may be used for any type of testing purposes, as shown at step 214. For example, the sink router could be replaced by a new type of router or a new network monitoring device that receives the traffic from the recombine router for testing. As a further example, an optical splitter or another traffic duplication device can be installed between the recombine router and the sink router to duplicate traffic to the devices for testing. By way of example and not limitation, the recombined traffic may be used to test a network element, to generate realistic cross-traffic while detecting worm scans on high-speed links, and to replay recorded denial-of-service attacks for testing intrusion detection systems.

As can be seen, the present invention and its equivalents are well-adapted to provide a new and useful method for generating realistic network traffic. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for generating realistic network traffic, the method comprising:
   providing a captured trace of network traffic from a network link, the captured trace comprising a duplicate record of the network traffic, wherein the captured trace is provided in an environment separate from a network in which it was captured;
   splitting the captured trace into a plurality of subtraces in the environment separate from the network in which it was captured, wherein splitting the captured trace into a plurality of subtraces includes:
   (1) selecting a number of subtraces,
   (2) splitting the captured trace into the number of subtraces,
   (3) selecting a threshold packet displacement, wherein a packet displacement represents a measure of distortion of the timing of packets in the recombined trace with respect to the timing of packets in the captured trace,
   (4) determining an actual packet displacement for the number of subtraces, and
   (5) if the actual packet displacement is greater than the selected threshold packet displacement, repeating the number of subtraces selecting step, splitting step, and determining step until the actual packet displacement is less than the selected threshold packet displacement;
   replaying the plurality of subtraces in the environment separate from the network in which the captured trace was captured;
   recombining the plurality of subtraces into a recombined trace that reproduces the network traffic in the environment separate from the network in which the captured trace was captured, wherein timing of packets in the recombined trace approximates the timing of packets in the captured trace; and
   testing a network element using the recombined trace in the environment separate from the network in which the captured trace was captured.

2. The method of claim 1, wherein providing a captured trace comprises capturing a trace of network traffic from a network link.

3. The method of claim 1, wherein testing the network element comprises routing the recombined trace through the network element.

4. The method of claim 1, wherein the network element is an Internet backbone device.

5. The method of claim 1, wherein the captured trace is from a high-speed network link with a transmission rate of at least OC-48.

6. The method of claim 5, wherein the high-speed network link is an Internet backbone.

7. The method of claim 1, wherein splitting the captured trace comprises a flow-based splitting.

8. A method for generating realistic network traffic, the method comprising:
   providing a captured trace of network traffic from a network link, the captured trace comprising a duplicate record of the network traffic, wherein the captured trace is provided in an environment separate from a network in which it was captured;
   splitting the captured trace into a plurality of subtraces in the environment separate from the network in which it was captured, wherein splitting the captured trace into a plurality of subtraces includes:
   (1) selecting a number of subtraces, wherein selecting a number of subtraces includes:
      a) selecting a threshold packet displacement, wherein a packet displacement represents a measure of distortion of the timing of packets in the recombined trace with respect to the timing of packets in the captured trace, and
      b) determining a number of subtraces, wherein replaying the subtraces creates an actual packet displacement that is less than the selected threshold packet displacement, and (2) splitting the captured trace into the number of subtraces;

replaying the plurality of subtraces in the environment separate from the network in which the captured trace was captured;

recombining the plurality of subtraces into a recombined trace that reproduces the network traffic in the environment separate from the network in which the captured trace was captured, wherein timing of packets in the recombined trace approximates the timing of packets in the captured trace; and testing a network element using the recombined trace in the environment separate from the network in which the captured trace was captured.

9. The method of claim 8, wherein replaying the plurality of subtraces comprises:

synchronizing the plurality of subtraces; and replaying the synchronized plurality of subtraces.

10. The method of claim 9, wherein synchronizing the plurality of subtraces comprises at least one of an NTP based synchronization method and a TSC based synchronization method.

11. The method of claim 9, wherein the plurality of subtraces are replayed using a plurality of replayers.

12. The method of claim 11, wherein the plurality of replayers are synchronized.

13. The method of claim 8, wherein testing the network element comprises routing the recombined trace through the network element.

14. The method of claim 8, wherein the network element is an Internet backbone device.

15. The method of claim 8, wherein the captured trace is from a high-speed network link with a transmission rate of at least OC-48.

16. The method of claim 15, wherein the high-speed network link is an Internet backbone.

17. The method of claim 8, wherein splitting the captured trace comprises a flow-based splitting.

18. One or more computer-storage media, having computer-usable instructions embodied thereon for performing a method comprising:

providing a captured trace of network traffic from a network link, the captured trace comprising a record of the network traffic;

selecting a threshold packet displacement, wherein a packet displacement represents a measure of distortion of timing of packets in a recombined trace with respect to the timing of packets in the captured trace;

determining a number of subtraces, wherein the subtraces result from splitting the captured trace into a plurality of subtraces, and wherein replaying and recombining the number of subtraces creates an actual packet displacement that is less than the threshold packet displacement;

splitting the captured trace into the number of subtraces;

replaying the number of subtraces; and recombining the number of subtraces into a recombined trace, wherein the timing of packets in the recombined trace approximates the timing of packets in the captured trace.

19. The media of claim 18, further comprising testing a network element using the recombined trace.

20. The media of claim 19, wherein testing the network element comprises routing the recombined trace through the network element.

21. The media of claim 20, wherein the network element is an Internet backbone device.

22. The media of claim 18 wherein the captured trace is from a high-speed network link with a transmission rate of at least OC-48.

23. The media of claim 22, wherein the high-speed network link is an Internet backbone.

24. The media of claim 18, wherein splitting the captured trace comprises a flow-based splitting.

* * * * *

UNITED STATES PATENT AND TRADEMARK OFFICE
CERTIFICATE OF CORRECTION

PATENT NO. : 7,639,627 B1  
APPLICATION NO. : 11/061241  
DATED : December 29, 2009  
INVENTOR(S) : Ye et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 758 days.

Signed and Sealed this

Ninth Day of November, 2010

David J. Kappos
*Director of the United States Patent and Trademark Office*